March 18, 1969  A. E. DOHERTY, JR., ET AL  3,432,912
EXPLOSIVE SEAM BONDING METHOD AND MACHINE
Filed Sept. 20, 1965
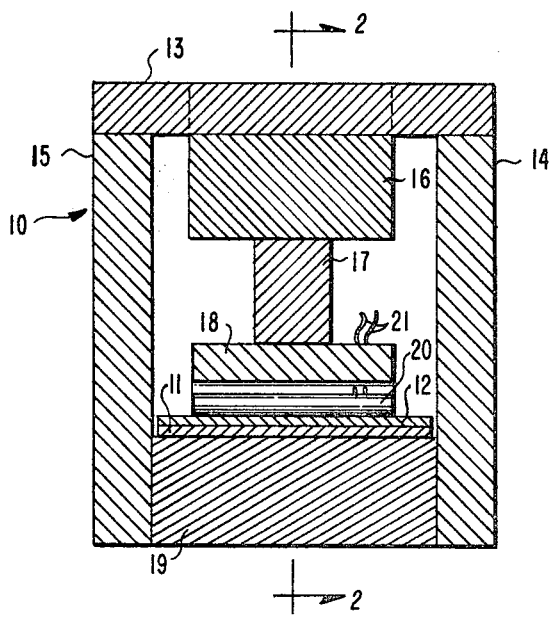
FIG.—1
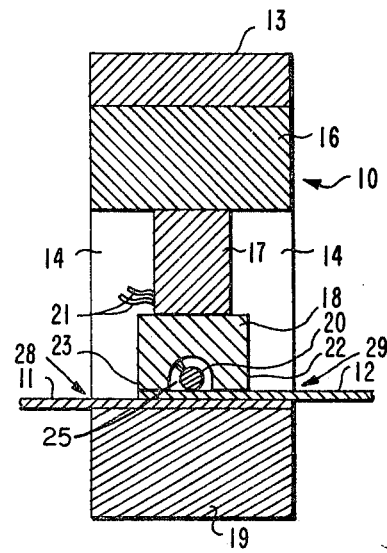
FIG.—2
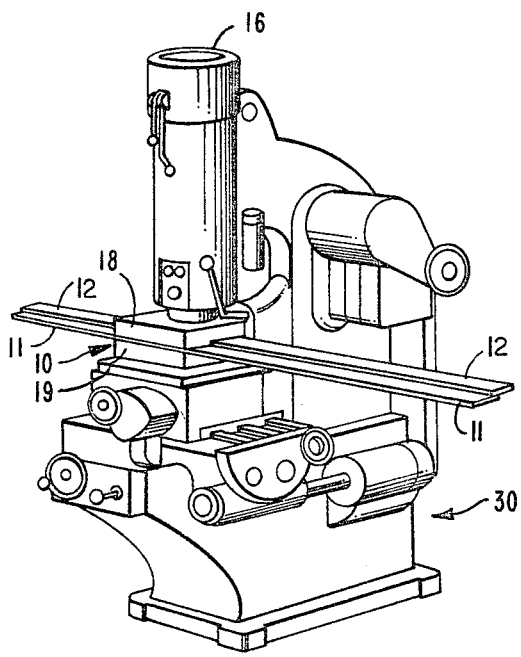
FIG.—3
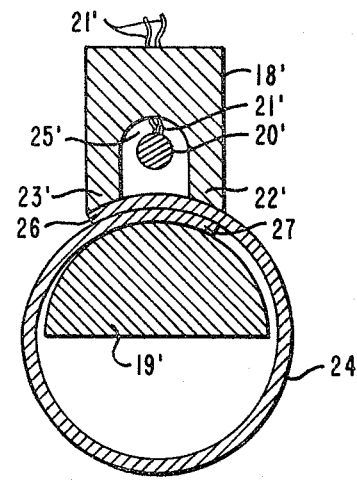
FIG.—4
INVENTORS
ALFRED E. DOHERTY
LOUIS H. KNOP
BY
George J. Netter
Edward Olinsell
ATTORNEYS United States Patent Office 3,432,912
Patented Mar. 18, 1969

3,432,912
EXPLOSIVE SEAM BONDING METHOD
AND MACHINE
Alfred E. Doherty, Jr., Anaheim, and Louis H. Knop,
Glendora, Calif., assignors to Aerojet-General Corporation, El Monte, Calif., a corporation of Ohio
Filed Sept. 20, 1965, Ser. No. 488,621
U.S. Cl. 29—470.1                           7 Claims
Int. Cl. B23k 27/00, 31/02

ABSTRACT OF THE DISCLOSURE

This disclosure concerns a method and apparatus for producing seam welds between superposed metallic layers by employing the force and pressure of explosively-generated shock waves. The apparatus includes an anvil and a restraining block provided with a cavity opening toward the anvil. An explosive charge is mounted within the cavity in overlying relation to the anvil. The metallic layers to be seam-welded are placed on the anvil in superposed relation, and the restraining block is then moved toward the anvil to clamp the metallic layers therebetween. The metallic layers when clamped in position extend across the mouth of the cavity formed in the restraining block, thereby confining the explosive charge within the cavity. Upon detonating the explosive charge, the explosive energy generated thereby causes the metallic layers to be fused and bonded together.

---

This invention relates to bonding or welding machines generally, and, more particularly, to a machine with which explosive charges are used to seam weld together metals of the same or different material.

The welding together of ends of sheet or other metal materials, such as may be encountered in metal strip rolling mills, pipe, tank and boiler manufacture or in assembly of bulkheads, curved surfaces and various small assemblies of metal components of diverse shapes, has usually been accomplished by electric or torch welding techniques. The former techniques are limited to relatively small areas of weld, and require a period of time for effecting that is directly proportional to the extent of weld. Strip mills have frequently used stapling for continuous bonding operations.

The present invention contemplates an improved bonding technique whereby two or more sheets of metal, or sheet metals and metal articles of indiscriminate shape may be welded together rapidly and in an exceptionally durable bond. The technique involves placing together the parts to be welded between an anvil and an appropriately configured restraining block and detonating an explosive charge to weld together the parts as a consequence of the high pressures of the shock waves impinging on the parts The technique can be used for limited portions of surfaces, or for continuous seam welding over extended areas. The metals being welded together by the technique described here need not be the same. Furthermore, more than two sheets may be welded together simultaneously. Both flat materials and fabricated materials may be welded together, or combinations thereof. The surfaces to be welded may be flat ends of different sheets or, as may be the case in pipe and tubing manufacture, the opposite ends of a common material.

Accordingly, it is an object of this invention to provide apparatus and method for the explosive bonding or welding of metal seams.

It is another object to provide a welding technique for bonding or welding sheet metal or other articles together in a minimum time.

It is a further object of this invention to provide a welding machine wherein metals are bonded together through the use of an explosive force.

It is still another object of this invention to provide apparatus capable of producing an explosively welded seam joint between two or more layers of similar or dissimilar metals.

It is a further object of this invention to provide seam welding apparatus that operates equally well on soft or hard metals.

And yet another object of this invention is to provide explosive welding apparatus whereby flat materials or fabricated materials can be joined quickly and securely.

These and other objects of the invention will become more clear from the following specification in which a preferred embodiment is described and shown in the drawings, taken together with the appended claims.

The embodiment shown in the figures and described herein should not be construed as limiting the invention to the specific means shown and described, but rather as illustrative of the teachings of the invention in the light of which those skilled in the art appertaining thereto may conceive other embodiments thereof within the ambit of the claims appended hereto.

In the drawings:

FIG. 1 is a cross-section view through a representative embodiment of an explosive bonding machine according to the invention showing metal sheets placed therein for bonding;

FIG. 2 is a cross-section taken along line 2—2 perpendicularly to the cross-section of FIG. 1;

FIG. 3 is a perspective view of a hydraulic press arrangement for securing the explosive welding machine of the invention about the metal parts during welding; and FIG. 4 is a sectional view of another aspect of the invention as applied to the welding of seams to form tubing.

With reference to FIGS. 1 and 2, there is shown a restraining block 18 and an anvil 19 with metallic sheets 11 and 12 pressingly disposed therebetween which are to be welded or bonded together. Restraining block 18 has a groove or cavity 25 in the underside thereof in which is disposed an explosive charge element 20 of any of a number of known types arranged longitudinally within the depression above the upper sheet 12 of the work material. The charge 20 may be in the form of a cord or plastic, for example. Wire leads 21 connected to charge 20 extend out of block 18 for connection to external detonating means (not shown).

Restraining block 18 is affixed to a ram 17 that is, in turn, operatively related to a movable part 16 of a hydraulic cylinder of a suitable press machine, such as that generally shown at 30 in FIG. 3. The feet 22, 23 formed by the base of block 18 and enclosing the cavity 25 may be flat, as shown in FIG. 2, or, for the seam welding of pipe 24 they may be suitably contoured as the legs 22', 23' of the block 18' of FIG. 4. As is seen in the latter illustration, the anvil 19' is shaped to mate with the contour of feet 22', 23' and juxtaposed ends 26, 27 of tubing 24 slip disposed between. For any other configurations, such as rectangular tubing, oval tubing or other, to be seam welded out of strip metal stock as 11, 12 or 24 correspondingly dimensioned anvils and restraining blocks with appropriately matching contours can be provided for receiving and holding the metal articles in proper relation.

The general operation of the explosive seam welding machine of this invention as described hereinabove is as follows:

An enclosure of the general character of that shown at 10, the exact configuration of which is determined by the specific materials to be welded, and which in part encloses the actuable or moving part 16 of a hydraulic press machine such as 30, provides a protective shield for the explosive work activity to be performed. Within enclosure 10, the base 19 thereof forms an anvil (FIGS. 1 and 2) upon which metallic materials to be welded together, such as sheets 11 and 12, are positioned with areas to be bonded in contacting relation. If the material to be welded is in the form of a tube such as 24 (FIG. 4), the anvil 19' is of a corresponding configuration. Affixed to the end of ram 17, which is movable with the part 16, is the restraining block 18 having a cavity or groove 25 centrally disposed therein for containing the explosive charge. With the anvil and restraining block securely holding the metal articles in position for bonding, the explosive charge is detonated. The resulting pressure developed between the metal articles immediately opposite the area of the explosion serves to bond the articles to one another tightly and securely.

While the press machine 30 shown here is a massive item because of the relatively large size of the articles being bonded together, it would be obvious to those skilled in this art that the same explosive welding principle may be applied equally well to smaller objects that would require correspondingly smaller anvils and restraining blocks. In fact, for manufacture of small size tubing, it is within the contemplation of the invention to provide bench apparatus that may be operated safely and expeditiously.

As may be seen in FIG. 2, a gap 28, 29 is provided in housing 10 through which strips of metal such as 11, 12 can be fed through the welding apparatus for continuous seam welding. Alternatively, enclosure 10 may be completely enclosed, if desired for noise reduction or added safety.

It should be clear to those skilled in the art pertaining to this invention, that in apparatus utilizing the method of this invention, the detonating connection leads such as 21, 21' may be connected with contact and timing mechanisms so that operation may be automated to explode the charge at some predetermined time in a cycle of movement of the parts to be welded together through the housing 10.

It is to be understod that the forms of the invention herewith shown and described are to be taken as preferred embodiments of the same, but that various changes in the shape, size and arrangement of parts may be resorted to without departing from the spirit of the invention or the scope of the subjoined claims.

What is claimed is:

1. An apparatus for seam welding a plurality of superposed metallic layers together through the use of explosively-generated energy, said apparatus comprising: an anvil for supporting the metallic layers to be welded together, said anvil having a weld area supporting surface for intimately contacting the metallic layer of said plurality of superposed metallic layers to be welded which is adjacent thereto along the entire extent of the selected weld area, a restraining block disposed in opposed relation to said anvil and being relatively movable toward and away from said anvil, said restraining block having a cavity therein provided with a mouth opening toward said anvil, said cavity being positioned in registering relation with the weld area supporting surface of said anvil, an explosive charge carried within said cavity in overlying aligned relation to the weld area supporting surface of said anvil, said restraining block being provided with a surface opposed to the weld area supporting surface of said anvil and bordering the mouth of the cavity formed in said restraining block, and said opposed surfaces of said restraining block and said anvil being parallel to each other with the surface of said restraining block being in registering overlying relation to a portion of the weld area supporting surface of said anvil and the superposed metallic layers to be welded being adapted to extend across the mouth of the cavity in said restraining block so as to close the mouth of the cavity confining said explosive charge within the cavity in response to relative movement of said restraining block toward said anvil to a position for clamping the superposed metallic layers to be welded therebetween, whereby the superposed metallic layers will be securely fused and bonded together along a weld area which is generally coextensive with the mouth of the cavity upon detonating said explosive charge by the force and pressure of the shock waves generated by the detonated explosive charge.

2. An apparatus as defined in claim 1, wherein the surface of said restraining block and the weld area supporting surface of said anvil are flat.

3. An apparatus as defined in claim 1, wherein the surface of said restraining block and the weld area supporting surface of said anvil are arcuate, whereby the superposed metallic layers to be welded may comprise the overlapping edge portions of a single metallic sheet which has been folded into a tubular form.

4. An apparatus for seam welding a plurality of superposed metallic layers together through the use of explosively-generated energy, said apparatus comprising: a frame, an anvil carried by the frame for supporting the metallic layers to be welded together, said anvil having a weld area supporting surface for intimately contacting the metallic layer of said plurality of superposed metallic layers to be welded which is adjacent thereto along the entire extent of the selected weld area, a ram movably disposed in opposed relation to the weld area supporting surface of said anvil, means for moving the ram toward and away from said anvil, a restraining block fixedly attached to said ram and being movable therewith, said restaining block facing said anvil and having a cavity therein provided with a mouth opening toward said anvil, said cavity being positioned in registering relation with the weld area supporting surface of said anvil, an explosive charge carried within said cavity in overlying aligned relation to the weld area supporting surface of said anvil, and the superposed metallic layers to be welded being adapted to extend across the mouth of the cavity in said restraining block so as to close the mouth of the cavity confining said explosive charge within the cavity in response to the movement of said ram by said means toward said anvil to a position for clamping the superposed metallic layers to be welded between said anvil and said restraining block, whereby the superposed metallic layers will be securely fused and bonded together along a weld area which is generally coextensive with the mouth of the cavity upon detonating said explosive charge by the force and pressure of the shock waves generated by the detonated explosive charge.

5. An apparatus for seam welding a plurality of superposed metallic layers together through the use of explosively-generated energy, said apparatus comprising: an anvil for supporting the metallic layers to be welded together, said anvil having a weld area supporting surface for intimately contacting the metallic layer of said plurality of superposed metallic layers to be welded which is adjacent thereto along the entire extent of the selected weld area, an elongated restraining block disposed in opposed relation to said anvil and being relatively movable toward and away from said anvil, said restraining block having a longitudinally extending cavity therein provided with an elongated mouth opening toward said anvil, said cavity being positioned in registering relation with the weld area supporting surface of said anvil, an elongated explosive charge carried within said cavity in overlying aligned relation to the weld area supporting surface of said anvil, said explosive charge extending lengthwise along the elongated mouth of said cavity in proximity thereto, and the superposed metallic layers to be welded being adapted to extend across the mouth of the cavity in said restraining block so as to close the mouth of the cavity confining said explosive charge within the cavity in response to relative movement of said restraining block toward said anvil to a position for clamping the superposed metallic layers to be welded therebetween, whereby the superposed metallic layers will be securely fused and bonded together along an elongated weld area generally coextensive with the mouth of the cavity upon detonating said explosive charge by the force and pressure of the shock waves generated by the detonated explosive charge.

6. A method for seam welding a plurality of metallic layers together, said method comprising the steps of placing overlapping portions of the metallic layers to be welded upon a weld area supporting surface of an anvil, disposing an explosive charge above the overlapping portions of the metallic layers in an open-mouthed cavity of a restraining block, clamping the overlapping portions of the metallic layers to the weld area supporting surface of the anvil with the respective metallic layers in intimately contacting engagement with each other throughout the areas of their overlapping portions and the weld area supporting surface of the anvil in intimately contacting engagement with the metallic layer adjacent thereto along the entire extent of the selected weld area, while simultaneously closing the mouth of the cavity by the overlapping portions of the metallic layers to confine the explosive charge within the cavity so as to direct the major portion of its explosive energy when detonated against the overlapping portions of th metallic layers, and detonating the explosive charge, whereby the overlapping portions of the metallic layers are fused and bonded together along a weld area which is generally coextensive with the mouth of the cavity by the force and pressure of the shock waves generated by the detonated explosive charge.

7. A method as defined in claim 6, further including the steps of releasing the overlapping portions of the metallic layers from clamped relationship following the detonation of the explosive charge, feeding the overlapping portions of the metallic layers across the anvil to advance the fused and bonded area of the overlapping portions of the metallic layers past the weld area supporting surface of the anvil while placing another non-fused section of the overlapping portions of the metallic layers upon the weld area supporting surface of the anvil, and repeating the sequence of steps beginning with the disposition of another explosive charge above the non-fused section of the overlapping portions of the metallic layers in the open-mouthed cavity of the restraining block and concluding with the detonation of this latter explosive charge so as to produce a continuous seam weld along the entire lengths of the overlapping portions of the metallic layers.

References Cited

UNITED STATES PATENTS

| | | | |
|---|---|---|---|
| 2,030,803 | 2/1936 | Temple. | |
| 3,031,007 | 4/1962 | Temple et al. | |
| 3,229,364 | 1/1966 | Thomas et al. | 29—474.3 |
| 3,325,075 | 6/1967 | Higuchi et al. | 228—3 |
| 3,344,510 | 10/1967 | Kameishi et al. | 29—470.1 |

JOHN F. CAMPBELL, *Primary Examiner.*

PAUL M. COHEN, *Assistant Examiner.*

U.S. Cl. X.R.

29—421, 497.5; 228—3